United States Patent
Fu et al.

(10) Patent No.: US 11,516,729 B2
(45) Date of Patent: Nov. 29, 2022

(54) METHOD AND DEVICE FOR TRANSMITTING ACCESS CONTROL INFORMATION, AND NETWORK SIDE DEVICE

(71) Applicant: CHINA ACADEMY OF TELECOMMUNICATIONS TECHNOLOGY, Beijing (CN)

(72) Inventors: Jing Fu, Beijing (CN); Jiangsheng Fan, Beijing (CN); Jing Liang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/044,076

(22) PCT Filed: Feb. 27, 2019

(86) PCT No.: PCT/CN2019/076262
§ 371 (c)(1),
(2) Date: Sep. 30, 2020

(87) PCT Pub. No.: WO2019/192271
PCT Pub. Date: Oct. 10, 2019

(65) Prior Publication Data
US 2021/0144622 A1    May 13, 2021

(30) Foreign Application Priority Data
Apr. 4, 2018    (CN) .......................... 201810299787.4

(51) Int. Cl.
*H04W 48/10* (2009.01)
*H04W 48/16* (2009.01)
*H04W 84/04* (2009.01)

(52) U.S. Cl.
CPC .......... *H04W 48/10* (2013.01); *H04W 48/16* (2013.01); *H04W 84/042* (2013.01)

(58) Field of Classification Search
CPC ... H04W 48/10; H04W 48/16; H04W 84/042; H04W 48/12; H04L 5/00; H04L 5/0053
See application file for complete search history.

(56) References Cited

U.S. PATENT DOCUMENTS

2011/0274040 A1    11/2011  Pani et al.
2015/0078323 A1    3/2015   Song et al.
(Continued)

FOREIGN PATENT DOCUMENTS

CN    102348254 A    2/2012
CN    102761933 A    10/2012
(Continued)

OTHER PUBLICATIONS

NPL—Taiwanese Office Action dated Nov. 8, 2019 for Application No. 108108197.
(Continued)

*Primary Examiner* — Diane D Mizrahi
(74) *Attorney, Agent, or Firm* — Harness, Dickey & Pierce, P.L.C.

(57) ABSTRACT

A method and a device for transmitting access control information, and a network side device are provided. The method for transmitting access control information includes: transmitting to a UE an access control information list and a mapping relationship between each group of access control parameters in the access control information list and an access control group.

18 Claims, 2 Drawing Sheets

```
┌─────────────────────────────────────────────────┐
│ acquiring an access control information list     │  401
│ and a mapping relationship between each group   │
│ of access control parameters in the access      │
│ control information list and an access control  │
│ group that are transmitted from a network side  │
│ device                                           │
└─────────────────────────────────────────────────┘
                        │
┌─────────────────────────────────────────────────┐
│ determining access control parameters of each   │  402
│ access control group in accordance with the     │
│ access control information list and the mapping │
│ relationship                                     │
└─────────────────────────────────────────────────┘
```

(56) References Cited

U.S. PATENT DOCUMENTS

| | | | |
|---|---|---|---|
| 2016/0057692 A1 | 2/2016 | Geng et al. | |
| 2019/0174392 A1 | 6/2019 | Chun et al. | |
| 2020/0221369 A1* | 7/2020 | Adjakple | ............ H04W 48/02 |

FOREIGN PATENT DOCUMENTS

| | | |
|---|---|---|
| CN | 103609062 A | 2/2014 |
| CN | 103731919 A | 4/2014 |
| CN | 104662964 A | 5/2015 |
| CN | 106028270 A | 10/2016 |
| WO | WO-2018/026185 A1 | 2/2018 |

OTHER PUBLICATIONS

NPL—Huawei, HiSilicon, "Access control signaling design", 3GPP TSG-RAN2 Meeting #101, R2-1803544, Athens, Greece, Feb. 26-Mar. 2, 2018.

NPL—Written Opinion of the International Searching Authority for International Application No. PCT/CN2019/076262 dated May 30, 2019.

NPL—International Search Report for International Application No. PCT/CN2019/076262 dated May 30, 2019.

Extended European Search Report dated Apr. 13, 2021 for Application No. EP 19782049.1.

Intel Corporation, "RAN implications of 5G Access Control requirements", 3GPP TSG RAN WG2 Meeting NRAdhoc 1801, R2-1800921, Vancouver, Canada, Jan. 22-26, 2018.

ZTE Corporation, Sanechips, "Consideration on the barring parameters", 3GPP TSG-RAN WG2 NR AD hoc 101, R2-1802031, Athens, Greece, Feb. 26-Mar. 2, 2018.

Ericsson, "Signaling of access control parameters", 3GPP TSG-RAN WG2 #101, Tdoc R2-1802353, Athens, Greece, Feb. 26-Mar. 2, 2018 (Resubmission of 1800320).

* cited by examiner

```
┌─────────────────────────────────────────────────┐
│ transmitting an access control information list and a │ ─ 101
│ mapping relationship between each group of access │
│ control parameters in the access control information list │
│ and an access control group to a UE              │
└─────────────────────────────────────────────────┘
```

Fig.1

```
     ┌──────────────┐
     │ transmission │ ─ 201
     │   module     │
     └──────────────┘
```

```
┌─────────────────────────────────────────────────┐
│ acquiring an access control information list and a mapping │ ─ 401
│ relationship between each group of access control parameters │
│ in the access control information list and an access control │
│ group that are transmitted from a network side device │
└─────────────────────────────────────────────────┘
                         │
┌─────────────────────────────────────────────────┐
│ determining access control parameters of each access control │ ─ 402
│ group in accordance with the access control information list │
│ and the mapping relationship                    │
└─────────────────────────────────────────────────┘
```

Fig.6

US 11,516,729 B2

METHOD AND DEVICE FOR TRANSMITTING ACCESS CONTROL INFORMATION, AND NETWORK SIDE DEVICE

CROSS-REFERENCE TO RELATED APPLICATIONS

The present application is the U.S. national phase of PCT Application No. PCT/CN2019/076262 filed on Feb. 27, 2019, which claims a priority of the Chinese patent application No. 201810299787.4 filed in China on Apr. 4, 2018, the disclosure of each of which are incorporated herein by reference in their entireties.

TECHNICAL FIELD

The present disclosure relates to the field of communication technology, in particular to a method and a device for transmitting access control information, and a network side device.

BACKGROUND

As stipulated in a New Radio (NR) system, the maximum quantity of Public Land Mobile Networks (PLMNs) allowed to be deployed in a shared cell is 12, and the maximum quantity of Access Categories (ACs) stipulated in a core network is 64, i.e., AC0 to AC63. AC0 to AC7 are standard ACs already defined in a standard, AC8 to AC31 are reserved ACs for the standard ACs, and AC32 to AC63 are reserved ACs for operators.

In a Long Term Evolution (LTE) system, one PLMN and one AC correspond to one group of parameters related to access control. An access control parameter corresponding an emergency communication AC is represented by one bit. Control parameters for the other ACs include 4-bit control factor parameter, 3-bit control timer parameter, and 5-bit state information representing 5 high-priority access identities (access identity 11 to access identity 15).

However, when the mode in the LTE system, i.e., the mode where one PLMN and one AC correspond to one group of parameters related to access control, continues to be used in the NR system, the parameters related to access control and required to be broadcast by a network side device exceeds 15000 bits. From the perspective of a terminal, due to such an overhead, it is difficult for the terminal to rapidly, accurately receive and use these access control parameters. From the perspective of the network side device, the maximum quantity of bits allowed to be transmitted through one System Information Block (SIB) is about 3000 bits. In this regard, when an organization principle of the access control parameters in the LTE system continues to be used in the NR system, a large quantity of SIB resources are occupied by the parameters related to access control in the NR system, so it is adverse to the overall resource deployment in the NR system.

SUMMARY

An object of the present disclosure is to provide a method and a device for transmitting access control information, and a network side device, so as to solve such a problem that the overall resource deployment in the NR system is adversely affected when a large quantity of SIB resources are occupied by the parameters related to access control.

In one aspect, the present disclosure provides in some embodiments a method for transmitting access control information, including transmitting an access control information list and a mapping relationship between each group of access control parameters and an access control group in the access control information list to a User Equipment (UE).

In a possible embodiment of the present disclosure, the access control parameters include at least one of a control factor parameter, a control timer parameter, and a high-priority access identity state parameter.

In a possible embodiment of the present disclosure, the mapping relationship is recorded as a correspondence between each access control group identity and list index numbers, or a correspondence between each list index number and access control group identities. The list index number is a sequence number of each group of access control parameters in the access control information list.

In a possible embodiment of the present disclosure, the access control group is each AC in each PLMN, a first AC group based on each PLMN, or a second AC group based on all PLMNs.

In a possible embodiment of the present disclosure, prior to transmitting to the UE the access control information list and the mapping relationship between each group of access control parameters in the access control information list and the access control group, the method further includes: transmitting grouping information about ACs to the UE via Non-Access Stratum (NAS) signaling or Access Stratum (AS) signaling, and the grouping information includes the access control group identity.

In a possible embodiment of the present disclosure, the transmitting to the UE the access control information list and the mapping relationship between each group of access control parameters in the access control information list and the access control group includes: transmitting the access control information list and the mapping relationship to the UE through system broadcasting, or carrying the access control information list and the mapping relationship to the UE through dedicated signaling.

In a possible embodiment of the present disclosure, the transmitting the access control information list and the mapping relationship to the UE through the system broadcasting includes carrying the access control information list and the mapping relationship to the UE using a plurality of SIBs.

In a possible embodiment of the present disclosure, the plurality of SIBs further carries a transmission identity, and the transmission identity is used to indicate whether there is an SIB to be transmitted.

In a possible embodiment of the present disclosure, the plurality of SIBs includes a first SIB and a second SIB, the first SIB includes the access control information list, and the second SIB includes the mapping relationship.

In a possible embodiment of the present disclosure, the first SIB further comprises the grouping information about the access control group, or the second SIB further comprises the grouping information about the access control group.

In another aspect, the present disclosure provides in some embodiments a method for transmitting access control information, including: acquiring an access control information list and a mapping relationship between each group of access control parameters and an access control group in the access control information list that are transmitted from a network side device; and determining access control parameters of each access control group in accordance with the access control information list and the mapping relationship.

In a possible embodiment of the present disclosure, the method further includes: acquiring grouping information transmitted from the network side device; and determining an access control parameter for each AC in each PLMN in accordance with the determined access control parameters of each access control group and the grouping information.

In yet another aspect, the present disclosure provides in some embodiments a device for transmitting access control information, including a transmission module configured to transmit to a UE an access control information list and a mapping relationship between each group of access control parameters in the access control information list and an access control group.

In still yet another aspect, the present disclosure provides in some embodiments a device for transmitting access control information, including: an acquisition module configured to acquire an access control information list and a mapping relationship between each group of access control parameters in the access control information list and an access control group transmitted from a network side device; and a determination module configured to determine access control parameters of each access control group in accordance with the access control information list and the mapping relationship.

In still yet another aspect, the present disclosure provides in some embodiments a network side device, including a transceiver, a memory, a processor, and a computer program stored in the memory and capable of being executed by the processor. The transceiver is configured to transmit to a UE an access control information list and a mapping relationship between each group of access control parameters in the access control information list and an access control group.

In a possible embodiment of the present disclosure, the access control parameters include at least one of a control factor parameter, a control timer parameter, and a high-priority access identity state parameter.

In a possible embodiment of the present disclosure, the mapping relationship is recorded as a correspondence between each access control group identity and list index numbers, or a correspondence between each list index number and access control group identities. The list index number is a sequence number of each group of access control parameters in the access control information list.

In a possible embodiment of the present disclosure, the access control group is each AC in each PLMN, a first AC group based on each PLMN, or a second AC group based on all PLMNs.

In a possible embodiment of the present disclosure, the transceiver is further configured to transmit grouping information about ACs to the UE via NAS signaling or AS signaling, and the grouping information includes the access control group identity.

In a possible embodiment of the present disclosure, the transceiver is further configured to transmit the access control information list and the mapping relationship to the UE through system broadcasting or carry the access control information list and the mapping relationship to the UE through dedicated signaling.

In a possible embodiment of the present disclosure, the transceiver is further configured to carry the access control information list and the mapping relationship to the UE using a plurality of SIBs.

In a possible embodiment of the present disclosure, the plurality of SIBs further carries a transmission identity, and the transmission identity is used to indicate whether there is an SIB to be transmitted.

In a possible embodiment of the present disclosure, the plurality of SIBs includes a first SIB and a second SIB, the first SIB includes the access control information list, and the second SIB includes the mapping relationship.

In a possible embodiment of the present disclosure, the first SIB or the second SIB further includes the grouping information about the access control group.

In still yet another aspect, the present disclosure provides in some embodiments a UE, including a transceiver, a memory, a processor, and a computer program stored in the memory and capable of being executed by the processor. The processor is configured to: acquire an access control information list and a mapping relationship between each group of access control parameters in the access control information list and an access control group that are transmitted from a network side device; and determine access control parameters of each access control group in accordance with the access control information list and the mapping relationship.

In a possible embodiment of the present disclosure, the processor is further configured to: acquire grouping information transmitted from the network side device; and determine an access control parameter for each AC in each PLMN in accordance with the determined access control parameters of each access control group and the grouping information.

In still yet another aspect, the present disclosure provides in some embodiments a computer-readable storage medium storing therein a computer program. The computer program is configured to be executed by a processor to implement the above-mentioned method for transmitting access control information for the network side device.

In still yet another aspect, the present disclosure provides in some embodiments a computer-readable storage medium storing therein a computer program. The computer program is configured to be executed by a processor to implement the above-mentioned method for transmitting access control information for the UE.

The present disclosure has the following beneficial effect. According to the method for transmitting access control information in the embodiments of the present disclosure, the access control information list and the mapping relationship between each group of access control parameters and the access control group in the access control information list may be transmitted to the UE. All possible access control parameters may be included in the access control information list, and the access control parameters may be divided into different groups according to different access control groups. The UE may acquire the access control parameters corresponding to each access control group from the access control information list in accordance with the mapping relationship. As a result, it is able to prevent the repeated transmission of the same access control parameter for different access control groups, thereby to reduce the quantity of system resources for the transmission, and meet the requirement on overall resource deployment.

DETAILED DESCRIPTION

In order to make the objects, the technical solutions and the advantages of the present disclosure more apparent, the present disclosure will be described hereinafter in details in conjunction with the drawings and embodiments.

In the related art, when an organization principle of access control parameters in an LTE system continues to be used in an NR system, a large quantity of system resources are occupied during the transmission, so it is adverse to the overall resource deployment in the NR system. An object of the present disclosure is to provide a method for transmitting access control information, so as to reduce an overhead for parameters related to access control.

Figure 1:
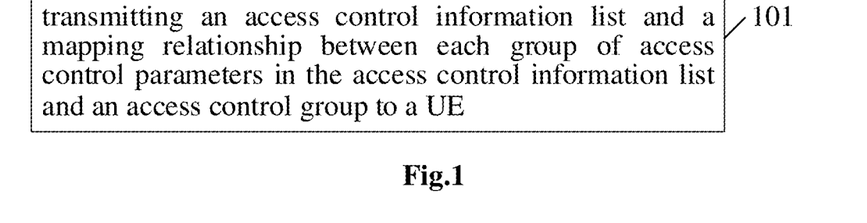
FIG. 1 is a flow chart of a method for transmitting access control information according to an embodiment of the present disclosure.

The present disclosure provides in some embodiments a method for transmitting access control information which, as shown in FIG. 1, includes Step 101 of transmitting an access control information list and a mapping relationship between each group of access control parameters in the access control information list and an access control group to a UE.

In this regard, a network side device may define the access control information list including all possible access control parameters, and the access control parameters may be divided into different groups according to the access control groups. The network side device may transmit the access control information list and the mapping relationship between each group of access control parameters and the access control group in the access control information list may be transmitted to the UE. The UE may acquire the access control parameters corresponding to each access control group from the access control information list in accordance with the received access control information list and the mapping relationship. The groups of access control parameters in the access control information list may be different from each other, so it is able to prevent the repeated transmission of the same access control parameter for different access control groups, thereby to reduce the quantity of system resources for the transmission, and meet the requirement on overall resource deployment.

For example, the quantity of groups of access control parameters corresponding to 64 ACs (access control groups) in a PLMN for the network side device may be actually 64, but due to the existence of same group of access control parameters, the quantity of groups of access control parameters actually recorded in the access control information list may be smaller than 64, e.g., 16 or 32. Hence, when the access control parameters are notified to the UE through transmitting the access control information list and the mapping relationship between each group of access control parameters in the access control information list and the AC, it is able to reduce the quantity of system resources occupied during the transmission, and meet the requirement on the overall resource deployment.

It should be appreciated that, although the maximum quantity of ACs stipulated in a core network is 64, the network side device may not only set the control parameters for the ACs stipulated in the core network, but also set the control parameters for AC groups after the ACs stipulated in the core network are divided into groups again in accordance with a predetermined grouping rule. Hence, in a possible embodiment of the present disclosure, each access control group may be each AC in each PLMN, a first AC group based on each PLMN, or a second AC group based on all PLMNs.

Here, the access control group may be each AC in each PLMN, i.e., each access control group identity may correspond to one AC number in one PLMN. Alternatively, the access control group may be the first AC group based on each PLMN, i.e., each access control group identity may correspond to one list of AC group numbers, and at this time, the ACs belonging to a same group may be independent of the PLMN. When the ACs belonging to a same group correspond to different PLMNs, the corresponding access control parameters may be different. Alternatively, the access control group may be the second AC group based on all PLMNs, i.e., each access control group identity may correspond to a set of {PLMN identity, AC group number}. At this time, when the access control groups belong to a same set, the corresponding access control parameters may be necessarily the same.

In a possible embodiment of the present disclosure, the access control parameters may include at least one of a control factor parameter, a control timer parameter, and a high-priority access identity state parameter.

In this regard, the access control parameters in the access control information list may include all parameters desired for the UE, i.e., the control factor parameter, the control timer parameter and the high-priority access identity state parameter. In addition, when one or two access control parameters for a plurality of access control groups are the same, merely different access control parameters may be recorded in the access control information list, and the access control parameters not recorded in the access control information list may be directly transmitted to the UE. For example, when a same control factor parameter is used by 64 ACs in one PLMN for the network side device, each group of access control parameters in the access control information list may merely include the control timer parameter and the high-priority access identity state parameter. During the transmission, apart from the access control information list and the mapping relationship between each group of access control parameters in the access control information list and the AC, a 4-bit control factor may also be transmitted to the UE so as to notify the UE of the control factor for the 64 ACs.

In addition, in a possible embodiment of the present disclosure, the mapping relationship may be recorded as a correspondence between each access control group identity and list index numbers, or a correspondence between each list index number and access control group identities. The list index number may be a sequence number of each group of access control parameters in the access control information list.

Here, the groups of access control parameters in the access control information list are different, and each group of access control parameters is not limited to corresponding to the access control group in a one-to-one manner, so with respect to the sequence number, i.e., the list index number, of each group of access control parameters in the access control information list, the mapping relationship may be recorded as the correspondence between each access control group identity and the list index numbers, or the correspondence between each list index number and the access control group identities.

Certainly, in order to acquire the access control parameters for the corresponding AC in accordance with the mapping relationship and the access control information list, the UE also needs to acquire the access control group identity. In a possible embodiment of the present disclosure, the access control group identity may be transmitted when transmitting the access control information list and the mapping relationship.

In addition, after the ACs are divided by the network side device into groups, in a possible embodiment of the present disclosure, prior to Step 101, the method may further include transmitting grouping information about ACs to the UE via NAS signaling or AS signaling.

Here, the grouping information may include the access control group identity, as well as the ACs and/or PLMNs in one access control group. Hence, after determining the access control parameter for each access control group in accordance with the access control information list and the mapping relationship between each group of access control parameters in the access control information list and the access control group, the UE may further acquire an access control parameter corresponding to each AC in each PLMN in accordance with the grouping information.

In a possible embodiment of the present disclosure, Step 101 may include transmitting the access control information list and the mapping relationship to the UE through system broadcasting, or carrying the access control information list and the mapping relationship to the UE through dedicated signaling.

In this regard, the access control information list and the mapping relationship may be transmitted to the UE through broadcasting or dedicated signaling.

The transmitting the access control information list and the mapping relationship to the UE through the system broadcasting may include carrying the access control information list and the mapping relationship to the UE using a plurality of SIBs.

Here, the network side device may transmit the access control information list and the mapping relationship to the UE using the plurality of SIBs.

In a possible embodiment of the present disclosure, a transmission identity may be further carried in the plurality of SIBs and used to indicate whether there is an SIB to be transmitted.

Here, the network side device may sequentially fill to-be-transmitted data into each SIB, and when it is impossible for a current SIB to carry all the data, another SIB may be used to carry the remaining data. In order to enable the UE to receive the complete data and prevent the unlimited reception, each SIB may further carry the transmission identity. The UE may determine whether there is an SIB to be transmitted in accordance with the transmission identity, determine whether to receive a next SIB, and stop the reception in time after the complete data has been received.

In a possible embodiment of the present disclosure, the plurality of SIBs may include a first SIB and a second SIB, the first SIB may include the access control information list, and the second SIB may include the mapping relationship.

Here, the SIBs for transmitting the data may be allocated in such a manner that the access control information list is transmitted using the first $SIB_i$ while the mapping relationship is transmitted using the second $SIB_j$. The second SIB may include one or more SIBs.

Certainly, as mentioned hereinabove, in order to acquire the access control parameters for the ACs in accordance with the mapping relationship and the access control information list, the UE needs to acquire the grouping information about the access control group, and the grouping information about the access control group may also be transmitted using the SIB. In a possible embodiment of the present disclosure, the first SIB or the second SIB may further include the grouping information about the access control group.

In this regard, the grouping information about the access control group may be transmitted using the first $SIB_i$ or the second $SIB_j$.

The method for transmitting access control information will be described hereinafter in conjunction with specific scenarios.

First Scenario: one access control information list for the network side device may include all possible access control parameters, e.g., 16 different groups of access control parameters. The access control information list may include the following parameters: {list index number, control factor, control timer, high-priority access identity state} (the list index number may alternatively not be included, and instead, the list index numbers corresponding to the access control information list may be acquired implicitly in accordance with an order of the group of access control parameters occurs in the access control information list).

With respect to the ACs stipulated in the core network, the network side device may record the mapping relationship between each group of access control parameters in the access control information list and the AC at the same time. The mapping relationship may include the followings.

a) The mapping relationship may include a list index number corresponding to each AC in each PLMN. The mapping relationship may be represented in a format {AC number, list index number} (at this time, the PLMN may be notified to the UE implicitly, e.g., the corresponding AC and the corresponding list index number in each PLMN may be listed sequentially in accordance with an order of the PLMNs broadcasted in system information), or {PLMN index number, AC number, list index number}.

b) The mapping relationship may include a set of ACs corresponding to each list index number. The mapping relationship may be represented in a format {list index number, list of {PLMN index number, AC number}}, or {list index number, list of AC numbers} (at this time, the PLMN may be notified to the UE implicitly, e.g., a respective set of {list index number, list of AC numbers} in each PLMN may be listed sequentially in accordance with an order of the PLMNs broadcasted in system information).

The network side device may transmit the above information to the UE through a system message or dedicated signaling. When the system message is used, the network side device may transmit the information to the UE using a plurality of SIBs, and a 1-bit transmission identity may be carried in each SIB so as to indicate whether an additional SIB needs to be transmitted. When the received SIB includes the 1-bit transmission identity indicating that an additional SIB is to be transmitted, the UE may continue to receive the subsequent SIB. The UE may receive and store the acquired list as well as the mapping relationship between each group of access control parameters in the list and the AC in each PLMN, so as to acquire the access control parameter for each AC in each PLMN. The UE may determine access control parameters corresponding to each access attempt in accordance with the PLMN and the AC corresponding to the access attempt in combination with the acquired access control parameter for each AC in each PLMN, and perform access control judgment in accordance with the access control parameters.

In a possible embodiment of the present disclosure, when the plurality of SIBs is used, the $SIB_i$ may include the access control information list, and the other SIBs ($SIB_j$, $SIB_k$) may include the mapping relationship.

Second Scenario: one access control information list for the network side device may include all possible access control parameters, e.g., the access control information list in the first scenario.

The network side device may re-group the ACs stipulated in the core network in each PLMN, e.g., group 1 may include AC=1, group 2 may include AC=3 and 7, group 3 may include AC=4, 5 and 6, group 4 may include AC=32-50, and group 5 may include AC=51-63. In addition, the network side device may record the mapping relationship between each group of access control parameters in the access control information list and the AC group in each PLMN. The mapping relationship may include the followings.

a) The mapping relationship may include a list index number corresponding to each AC group acquired through re-grouping in each PLMN. To be specific, in a first format, the mapping relationship may include a set of {group number, list index number} in each PLMN in an ascending order of the PLMNs (at this time, the PLMNs may be notified implicitly). For example, there are two PLMNs, and the mapping relationship may include a mapping relationship list 1 and a mapping relationship list 2. The mapping relationship list 1 may be a mapping relationship for PLMN index number=1, and it may include {group 1, list index number 2}, {group 2, list index number 4}, {group 3, list index number 4}, {group 4, list index number 1}, {group 5, list index number 1}. The mapping relationship list 2 may be a mapping relationship for PLMN index number=2, and it may include {group 1, list index number 5}, {group 2, list index number 2}, {group 3, list index number 1}, {group 4, list index number 5}, {group 5, list index number 2}.

Alternatively, in a second format, the mapping relationship may include a set of {PLMN index number, group number, list index number}. For example, the mapping relationship list may include {PLMN index number 1, group 1, list index number 2}, {PLMN index number 1, group 2, list index number 4}, {PLMN index number 1, group 3, list index number 4}, {PLMN index number 1, group 4, list index number 1}, {PLMN index number 1, group 5, list index number 1}, {PLMN index number 2, group 1, list index number 5}, {PLMN index number 2, group 2, list index number 2}, {PLMN index number 2, group 3, list index number 1}, {PLMN index number 2, group 4, list index number 5}, and {PLMN index number 2, group 5, list index number 2}.

b) The mapping relationship may include a set of groups corresponding to each list index number. To be specific, in a first format, the mapping relationship may include {list index number, set of {PLMN index number, group number}}. For example, the mapping relationship list may include {list index number 1, {PLMN index number 1, group 4}, {PLMN index number 1, group 5} and {PLMN index number 2, group 3}}, {list index number 2, {PLMN index number 1, group 1}, {PLMN index number 2, group 2} and {PLMN index number 2, group 5}}, {list index number 4, {PLMN index number 1, group 2} and {PLMN index number 1, group 3}}, and {list index number 5, {PLMN index number 2, group 1} and {PLMN index number 2, group 5}}.

Alternatively, in a second format, the mapping relationship may include {list index number, list of group number (including one or more group numbers)} in each PLMN in an ascending order of the PLMNs (at this time, the PLMNs may be notified implicitly). For example, the mapping relationship list may include a mapping relationship list 1 and a mapping relationship list 2. The mapping relationship list 1 may be a mapping relationship corresponding to PLMN index number=1, and it may include {list index number 1, {group 4, group 5}}, {list index number 2, {group 1}}, and {list index number 4, {group 2, group 3}}. The mapping relationship list 2 may be a mapping relationship corresponding to PLMN index number=1, and it may include {list index number 1, {group 3}}, {list index number 2, {group 2, group 5}}, and {list index number 5, {group 1, group 4}}.

The network side device may transmit the above information to the UE using a system message or dedicated signaling. When the system message is used, the network side device may transmit the information to the UE using a plurality of SIBs, and a 1-bit transmission identity may be carried in each SIB so as to indicate whether an additional SIB needs to be transmitted.

In a possible embodiment of the present disclosure, when the plurality of SIBs is used, the $SIB_i$ may include the access control information list, and the other SIBs ($SIB_j$, $SIB_k$) may include the mapping relationship.

The grouping information about the access control group may be carried in the $SIB_i$, or the other SIBs ($SIB_j$, $SIB_k$).

In addition, in this scenario, the grouping information about the AC access control group may also be transmitted in advance by the network side device to the UE through NAS signaling or AS signaling, and then the list and the mapping relationship may be transmitted to the UE subsequently through broadcasting or dedicated signaling.

The UE may receive and store the acquired list as well as the mapping relationship between each group of access control parameters in the list and the AC group in each PLMN, so as to acquire the access control parameter for each AC group in each PLMN.

The UE may further determine the access control parameter for each AC in each PLMN in accordance with the grouping information about the access control group (when the grouping information is transmitted by the network side device to the UE via an NAS, an NAS of the UE needs to notify the grouping information to an AS of the UE through interlayer interaction). The UE may determine access control parameters corresponding to each access attempt in accordance with the PLMN and the AC corresponding to the access attempt in combination with the acquired access control parameter for each AC in each PLMN, and perform access control judgment in accordance with the access control parameters.

Alternatively, the NAS or AS of the UE may determine a PLMN and an AC group in the PLMN corresponding to each access attempt in accordance with the acquired grouping information about the AC access control group. In this regard, the UE may determine the access control parameters corresponding to the access attempt in accordance with the stored access control parameter for each AC group in each PLMN, and perform access control judgment in accordance with the access control parameters.

Third Scenario: one access control information list for the network side device may include all possible access control parameters, e.g., the access control information list in the first scenario.

The network side device may re-group the ACs stipulated in the core network in all the PLMNs, e.g., group 1 may include {PLMN=1, AC=4-6} and {PLMN=2, AC=1}, group 2 may include {PLMN=1-2, AC=3-7}, and group 3 may include {all PLMNs, AC=32-64}. In addition, the network side device may record the mapping relationship between each group of access control parameters in the access control information list and the AC group. The mapping relationship may include the followings.

a) The mapping relationship may include a list index number corresponding to each AC group, and it may be represented in a format of {group number, list index number}.

b) Alternatively, the mapping relationship may include a set of AC groups corresponding to each list index number, and it may be represented in a format of {list index number, list of group numbers}.

The network side device may transmit the above information to the UE using a system message or dedicated signaling. When the system message is used, the network side device may transmit the information to the UE using a plurality of SIBs, and a 1-bit transmission identity may be carried in each SIB so as to indicate whether an additional SIB needs to be transmitted. In addition, in this scenario, after the ACs are divided into groups, the grouping information about the access control group may also be transmitted in advance by the network side device to the UE through NAS signaling or AS signaling, and then the list and the mapping relationship may be transmitted to the UE subsequently through broadcasting or dedicated signaling.

The UE may receive and store the acquired list as well as the mapping relationship between each group of access control parameters in the list and the AC group, so as to acquire the access control parameter for each AC group.

The UE may further determine the access control parameter for each AC in each PLMN in accordance with the grouping information about the AC access control group (when the grouping information is transmitted by the network side device to the UE via an NAS, an NAS of the UE needs to notify the grouping information to an AS of the UE through interlayer interaction). The UE may determine access control parameters corresponding to each access attempt in accordance with the PLMN and the AC corresponding to the access attempt in combination with the acquired access control parameter for each AC in each PLMN, and perform access control judgment in accordance with the access control parameters.

Alternatively, the NAS or AS of the UE may determine an AC group corresponding to each access attempt in accordance with the acquired grouping information about the access control group. In this regard, the UE may determine the access control parameters corresponding to the access attempt in accordance with the stored access control parameter for each AC group, and perform access control judgment in accordance with the access control parameters.

In a word, according to the method for transmitting access control information in the embodiments of the present disclosure, the access control information list and the mapping relationship between each group of access control parameters and the access control group in the access control information list may be transmitted to the UE. All possible access control parameters may be included in the access control information list, and the access control parameters may be divided into different groups corresponding to different access control groups. The UE may acquire the access control parameters corresponding to each access control group from the access control information list in accordance with the mapping relationship. As a result, it is able to prevent the repeated transmission of the same access control parameter for different access control groups, thereby to reduce the quantity of system resources for the transmission, and meet the requirement on overall resource deployment. In addition, it is able for the UE to rapidly and accurately receive and use the access control parameters.

Figure 2:
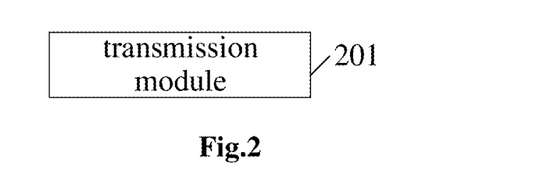
FIG. 2 is a schematic view showing a device for transmitting access control information according to an embodiment of the present disclosure.

The present disclosure further provides in some embodiments a device for transmitting access control information which, as shown in FIG. 2, includes a transmission module 201 configured to transmit an access control information list and a mapping relationship between each group of access control parameters in the access control information list and an access control group to a UE.

In a possible embodiment of the present disclosure, the access control parameters may include at least one of a control factor parameter, a control timer parameter, and a high-priority access identity state parameter.

In a possible embodiment of the present disclosure, the mapping relationship may be recorded as a correspondence between each access control group identity and list index numbers, or a correspondence between each list index number and access control group identities. The list index number may be a sequence number of each group of access control parameters in the access control information list.

In a possible embodiment of the present disclosure, the access control group may be each AC in each PLMN, a first AC group based on each PLMN, or a second AC group based on all PLMNs.

In a possible embodiment of the present disclosure, the device may further include a grouping information transmission module configured to transmit grouping information about ACs to the UE via NAS signaling or AS signaling, and the grouping information may include the access control group identity.

In a possible embodiment of the present disclosure, the transmission module may include a transmission sub-module configured to transmit the access control information list and the mapping relationship to the UE through system broadcasting, or carry the access control information list and the mapping relationship to the UE through dedicated signaling.

In a possible embodiment of the present disclosure, the transmission sub-module is further configured to carry the access control information list and the mapping relationship to the UE using a plurality of SIBs.

In a possible embodiment of the present disclosure, a transmission identity may be further carried in the plurality of SIBs and used to indicate whether there is an SIB to be transmitted.

In a possible embodiment of the present disclosure, the plurality of SIBs may include a first SIB and a second SIB, the first SIB includes the access control information list, and the second SIB includes the mapping relationship.

In a possible embodiment of the present disclosure, the first SIB or the second SIB may further include the grouping information about the access control group.

It should be appreciated that, the device may be used to implement the above-mentioned method for transmitting access control information for the network side device, and the implementation of the device may refer to that of the method mentioned hereinabove with a same technical effect.

Figure 4:
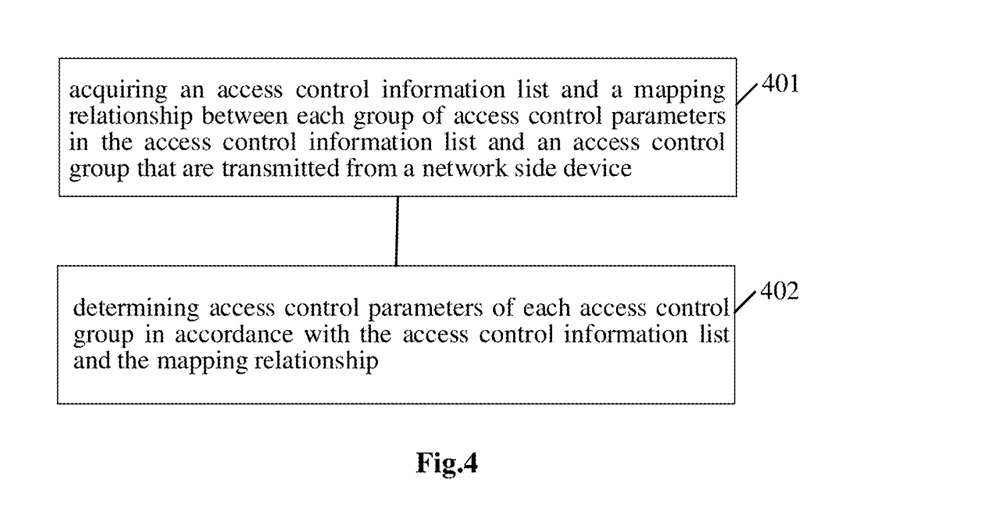
FIG. 4 is a flow chart of another method for transmitting access control information according to an embodiment of the present disclosure.

The present disclosure further provides in some embodiments a method for transmitting access control information which, as shown in FIG. 4, includes: Step 401 of acquiring an access control information list and a mapping relationship between each group of access control parameters in the access control information list and an access control group that are transmitted from a network side device; and Step 402 of determining access control parameters of each access control group in accordance with the access control information list and the mapping relationship.

In the embodiments of the present disclosure, the UE may acquire the access control parameters corresponding to each access control group from the access control information list in accordance with the received access control information list and the mapping relationship. The groups of access control parameters in the access control information list may be different from each other, so it is able to prevent the repeated transmission of the same access control parameter for different access control groups, thereby to reduce the quantity of system resources for the transmission, and meet the requirement on overall resource deployment.

In a possible embodiment of the present disclosure, the method may further include: acquiring grouping information transmitted from the network side device; and determining access control parameter for each AC in each PLMN in accordance with the determined access control parameters of each access control group and the grouping information.

In a possible embodiment of the present disclosure, the mapping relationship may be recorded as a correspondence between each access control group identity and list index numbers, or a correspondence between each list index number and access control group identities. The list index number may be a sequence number of each group of access control parameters in the access control information list.

In a possible embodiment of the present disclosure, the access control group may be each AC in each PLMN, a first AC group based on each PLMN, or a second AC group based on all PLMNs.

In addition, as mentioned hereinabove, the network side device may transmit the access control information list and the mapping relationship to the UE through system broadcasting or dedicated signaling, so correspondingly, the UE may receive the access control information list and the mapping relationship through system broadcasting or dedicated signaling.

In addition, after dividing the ACs into groups, the network side device may transmit the acquired grouping information including the access control group identity to the UE through NAS signaling or AS signaling, i.e., the UE may acquire the grouping information through the NAS signaling or AS signaling. Certainly, when the grouping information is transmitted by the network side device using the SIBs through system broadcasting, the UE may acquire the desired grouping information using the SIBs, and further determine the access control parameter for each AC in each PLMN in accordance with the grouping information.

It should be appreciated that, the method corresponds to the above-mention method for transmitting the access control information for the network side device, and may be applied to the UE, and the implementation of the method may refer to that of the UE mentioned in the method for transmitting access control information for the network side device with a same technical effect.

Figure 5:
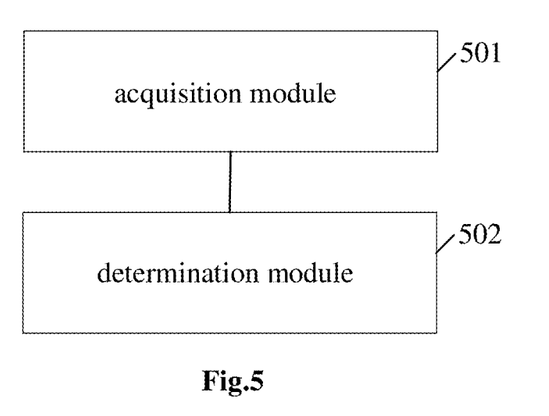
FIG. 5 is a schematic view showing another device for transmitting access control information according to an embodiment of the present disclosure.

The present disclosure further provides in some embodiments a device for transmitting access control information which, as shown in FIG. 5, includes: an acquisition module 501 configured to acquire an access control information list and a mapping relationship between each group of access control parameters in the access control information list and an access control group that are transmitted from a network side device; and a determination module 502 configured to determine access control parameters of each access control group in accordance with the access control information list and the mapping relationship.

In a possible embodiment of the present disclosure, the device may further include: a grouping information acquisition module configured to acquire grouping information transmitted from the network side device; and an AC access control parameter determination module configured to determine access control parameter for each AC in each PLMN in accordance with the determined access control parameters of each access control group and the grouping information.

It should be appreciated that, the device may be used to implement steps of the method for transmitting access control information for the UE, and the implementation of the device may refer to that of the method mentioned hereinabove with a same technical effect.

Figure 3:
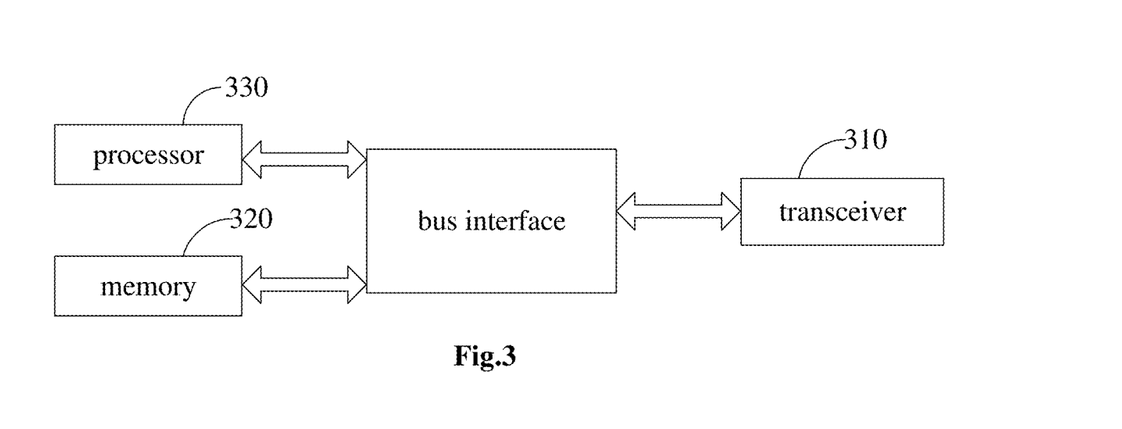
FIG. 3 is a schematic view showing a network side device according to an embodiment of the present disclosure.

The present disclosure further provides in some embodiments a network side device which, as shown in FIG. 3, includes a transceiver 310, a memory 320, a processor 330, and a computer program stored in the memory 320 and executed by the processor 330. The transceiver is configured to transmit an access control information list and a mapping relationship between each group of access control parameters in the access control information list and an access control group to a UE.

In a possible embodiment of the present disclosure, the access control parameters may include at least one of a control factor parameter, a control timer parameter, and a high-priority access identity state parameter.

In a possible embodiment of the present disclosure, the mapping relationship may be recorded as a correspondence between each access control group identity and list index numbers, or a correspondence between each list index number and access control group identities. The list index number may be a sequence number of each group of access control parameters in the access control information list.

In a possible embodiment of the present disclosure, the access control group may be each AC in each PLMN, a first AC group based on each PLMN, or a second AC group based on all PLMNs.

In a possible embodiment of the present disclosure, the transceiver 310 is further configured to transmit grouping information about ACs to the UE via NAS signaling or AS signaling, and the grouping information may include the access control group identity.

In a possible embodiment of the present disclosure, the transceiver 310 is further configured to transmit the access control information list and the mapping relationship to the UE through system broadcasting, or carry the access control information list and the mapping relationship to the UE through dedicated signaling.

In a possible embodiment of the present disclosure, the transceiver 310 is further configured to carry the access control information list and the mapping relationship to the UE using a plurality of SIBs.

In a possible embodiment of the present disclosure, a transmission identity may be further carried in the plurality of SIBs and used to indicate whether there is an SIB to be transmitted.

In a possible embodiment of the present disclosure, the plurality of SIBs may include a first SIB and a second SIB, the first SIB may include the access control information list, and the second SIB may include the mapping relationship.

In a possible embodiment of the present disclosure, the first SIB or the second SIB may further include the identity the access control group.

In FIG. 3, bus architecture may include a number of buses and bridges connected to each other, so as to connect various circuits for one or more processors such as the processor 330 and one or more memories such as the memory 320. In addition, as is known in the art, the bus architecture may be used to connect any other circuits, such as a circuit for a peripheral device, a circuit for a voltage stabilizer and a power management circuit, and thus is not further defined herein. A bus interface may be provided, and the transceiver 310 may consist of a plurality of elements, i.e., a transmitter and a receiver for communication with various other devices over a transmission medium. The processor 330 may take charge of managing the bus architecture as well as general processings. The memory 320 may store therein data for the operation of the processor 330.

Figure 6:
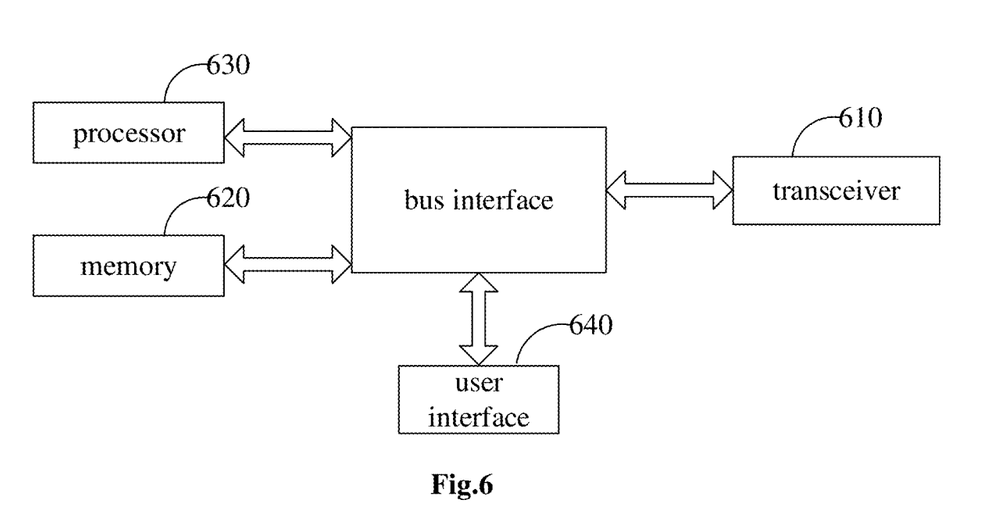
FIG. 6 is a schematic view showing a UE according to an embodiment of the present disclosure.

The present disclosure further provides in some embodiments a UE which, as shown in FIG. 6, includes a transceiver 610, a memory 620, a processor 630, and a computer program stored in the memory 620 and executed by the processor 630. The processor 630 is configured to: acquire an access control information list and a mapping relationship between each group of access control parameters in the access control information list and an access control group that are transmitted from a network side device; and determine access control parameters of each access control group in accordance with the access control information list and the mapping relationship.

In a possible embodiment of the present disclosure, the processor 630 is further configured to: acquire grouping information transmitted from the network side device; and determine access control parameter for each AC in each PLMN in accordance with the determined access control parameters of each access control group and the grouping information.

In FIG. 6, bus architecture may include a number of buses and bridges connected to each other, so as to connect various circuits for one or more processors such as the processor 630 and one or more memories such as the memory 620. In addition, as is known in the art, the bus architecture may be used to connect any other circuits, such as a circuit for a peripheral device, a circuit for a voltage stabilizer and a power management circuit, and thus is not further defined herein. A bus interface may be provided, and the transceiver 610 may consist of a plurality of elements, i.e., a transmitter and a receiver for communication with various other devices over a transmission medium. With respect to different UEs, a user interface 640 may also be provided for devices which are to be arranged inside or outside the UE, and these devices may include but not limited to a keypad, a display, a speaker, a microphone and a joystick.

The processor 630 may take charge of managing the bus architecture as well as general processings. The memory 620 may store therein data for the operation of the processor 630.

The present disclosure further provides in some embodiments a computer-readable storage medium storing therein a computer program. The computer program is configured to be executed by a processor to implement the steps of the above-mentioned method for transmitting access control information for the network side device.

The present disclosure further provides in some embodiments a computer-readable storage medium storing therein a computer program. The computer program is configured to be executed by a processor to implement the above-mentioned method for transmitting access control information for the UE.

The computer-readable storage medium may include volatile or nonvolatile, mobile or immobile storage medium capable of storing therein information using any method or technique. The information may be a computer-readable instruction, a data structure, a program module or any other data. The computer-readable storage medium may include, but not limited to, a Random Access Memory (RAM) (e.g., Phase Change Random Access Memory (PRAM), Static Random Access Memory (SRAM) or Dynamic Random Access Memory (DRAM)), a Read Only Memory (ROM) (e.g., an Electrically Erasable Programmable Read Only Memory (EEPROM), a flash memory, a Compact Disc Read Only Memory (CD-ROM) or a Digital Video Disk (DVD)), a magnetic storage device (e.g., a cassette magnetic tape or a magnetic disk), or any other non-transmission medium capable of storing therein information which can be accessed by a computing device. As defined in the present disclosure, the computer-readable storage medium may not include any transitory media, e.g., modulated data signal and carrier.

It should be appreciated that, the UE described in the specification may include, but not limited to, smart phone or flat-plane computer. The functional members described in the specification may be referred to as modules, so as to emphasize the independence of the implementation in a more particular manner.

In the embodiments of the present disclosure, the modules may be implemented by software, so as to be executed by various processors. For example, an identified, executable code module may include one or more physical or logical blocks including computer instructions, and the module or unit may be constructed as an object, a process or a function. Even so, the executable codes of the identified modules are unnecessary to be physically located together, but may include different instructions stored at different locations. When these instructions are logically combined together, they may form the modules and achieve the prescribed purposes of the modules.

Actually, the executable code module may be a single instruction or a plurality of instructions, and may even be distributed at different code segments, in different programs, or across a plurality of memory devices. Also, operational data may be identified in the modules, implemented in any appropriate form, and organized in any data structure of an appropriate type. The operational data may be collected as a single data set, or distributed at different locations (including different memory devices), and may be at least partially present in a system or network merely as an electronic signal.

When the modules are implemented by software, considering the current hardware level, a person skilled in the art may build a corresponding hardware circuit to achieve the corresponding function if taking no account of the cost. The hardware circuit comprises a conventional Very Large Scale Integration (VLSI) circuit, a gate array, an existing semiconductor such as a logic chip and a transistor, or other discrete components. The modules may further be implemented by a programmable hardware device, such as a field-programmable gate array, a programmable array logic device and a programmable logic device.

The above illustrative embodiments have been described with respect to the drawings, and the other embodiments may also feasible without departing from the spirit and teaching of the present disclosure, so the illustrative embodiments shall not be used to limit the scope of the present disclosure. More definitely, the illustrative embodiments are provided so as to make the present disclosure complete, and deliver the scope of the present disclosure to a person skilled in the art. In the drawings, sizes and relative sizes of the members may be scaled up for clarification. Terms involved in the present disclosure are merely used to describing the specific embodiments, but shall not be inclined to become a restricted use. Unless otherwise defined, such words as "one" or "one of" are merely used to represent the existence of at least one member, rather than to limit the number thereof. Such words as "include" or "including" intend to indicate that there are the features, integers, steps, operations, elements and/or assemblies, without excluding the existence or addition of one or more other features, integers, steps, operations, elements, assemblies and/or combinations thereof. Unless otherwise defined, a numerical range may include an upper limit, a lower limit and any sub-range therebetween.

The above are preferred embodiments of the present disclosure. It should be appreciated that a person skilled in the art may make further modifications and improvements without departing from the principle of the present disclosure, and these modifications and improvements shall also fall within the scope of the present disclosure.

What is claimed is:

1. A method for transmitting access control information, comprising:
transmitting to a User Equipment (UE) an access control information list and a mapping relationship between a group of access control parameters in the access control information list and an access control group,
wherein the mapping relationship is recorded as:
a correspondence between an access control group identity and a list index number; or
a correspondence between a list index number and an access control group identity or an identity list,
wherein the list index number is a sequence number of the group of access control parameters in the access control information list.

2. The method according to claim 1, wherein the access control parameters comprise at least one of a control factor parameter, a control timer parameter, and a high-priority access identity state parameter.

3. The method according to claim 1, wherein the access control group is an Access Category (AC) in a Public Land Mobile Network (PLMN), or a first AC group based on a PLMN, or a second AC group based on all PLMNs.

4. The method according to claim 1, wherein prior to transmitting to the UE the access control information list and the mapping relationship between the group of access control parameters in the access control information list and the access control group, the method further comprises:
transmitting grouping information about ACs to the UE via Non-Access Stratum (NAS) signaling or Access Stratum (AS) signaling, and the grouping information comprises the access control group identity.

5. The method according to claim 1, wherein the transmitting to the UE the access control information list and the mapping relationship between the group of access control parameters in the access control information list and the access control group comprises:
transmitting the access control information list and the mapping relationship to the UE through system broadcasting; or
carrying the access control information list and the mapping relationship to the UE through dedicated signaling.

6. The method according to claim 5, wherein the transmitting the access control information list and the mapping relationship to the UE through the system broadcasting comprises:
carrying the access control information list and the mapping relationship to the UE by using a plurality of System Information Blocks (SIBs).

7. The method according to claim 6, wherein the plurality of SIBs further carries a transmission identity, and the transmission identity is used to indicate whether there is an SIB to be transmitted.

8. The method according to claim 6,
wherein the plurality of SIBs comprises a first SIB and a second SIB,
wherein the first SIB comprises the access control information list; and
the second SIB comprises the mapping relationship.

9. The method according to claim 8, wherein the first SIB further comprises the grouping information about the access control group, or the second SIB further comprises the grouping information about the access control group.

10. A method for transmitting access control information, comprising:
acquiring an access control information list and a mapping relationship between a group of access control parameters in the access control information list and an access control group that are transmitted from a network side device; and
determining access control parameters of an access control group in accordance with the access control information list and the mapping relationship,
wherein the mapping relationship is recorded as:
a correspondence between an access control group identity and a list index number; or
a correspondence between a list index number and an access control group identity or an identity list,
wherein the list index number is a sequence number of the group of access control parameters in the access control information list.

11. The method according to claim 10, further comprising:
acquiring grouping information transmitted from the network side device;
determining an access control parameter for an AC in a PLMN in accordance with the determined access control parameters of the access control group and the grouping information.

12. A network side device, comprising a transceiver, a memory, a processor, and a computer program stored in the memory and capable of being executed by the processor,
wherein the transceiver is configured to transmit to a UE an access control information list and a mapping relationship between a group of access control parameters in the access control information list and an access control group;
wherein the mapping relationship is recorded as:
a correspondence between an access control group identity and a list index number; or
a correspondence between a list index number and an access control group identity or an identity list,
wherein the list index number is a sequence number of the group of access control parameters in the access control information list.

13. The network side device according to claim 12, wherein the access control parameters comprise at least one of a control factor parameter, a control timer parameter, and a high-priority access identity state parameter.

14. The network side device according to claim 12, wherein the access control group is an AC in a PLMN, or a first AC group based on the PLMN, or a second AC group based on all PLMNs.

15. The network side device according to claim 12, wherein the transceiver is further configured to:
transmit grouping information about ACs to the UE via NAS signaling or AS signaling, and the grouping information comprises the access control group identity.

16. The network side device according to claim 12, wherein the transceiver is further configured to:
- transmit the access control information list and the mapping relationship to the UE through system broadcasting; or
- carry the access control information list and the mapping relationship to the UE through dedicated signaling.

17. A UE, comprising a transceiver, a memory, a processor, and a computer program stored in the memory and capable of being executed by the processor, wherein the processor is configured to:
- acquire an access control information list and a mapping relationship between a group of access control parameters in the access control information list and an access control group that are transmitted from a network side device; and
- determine access control parameters of an access control group in accordance with the access control information list and the mapping relationship, wherein the mapping relationship is recorded as:
- a correspondence between an access control group identity and a list index number; or
- a correspondence between a list index number and an access control group identity or an identity list, wherein the list index number is a sequence number of the group of access control parameters in the access control information list.

18. The UE according to claim 17, wherein the processor is further configured to:
- acquire grouping information transmitted from the network side device;
- determine an access control parameter for an AC in a PLMN in accordance with the determined access control parameters of the access control group and the grouping information.

* * * * *